United States Patent Office 3,360,139
Patented Dec. 26, 1967

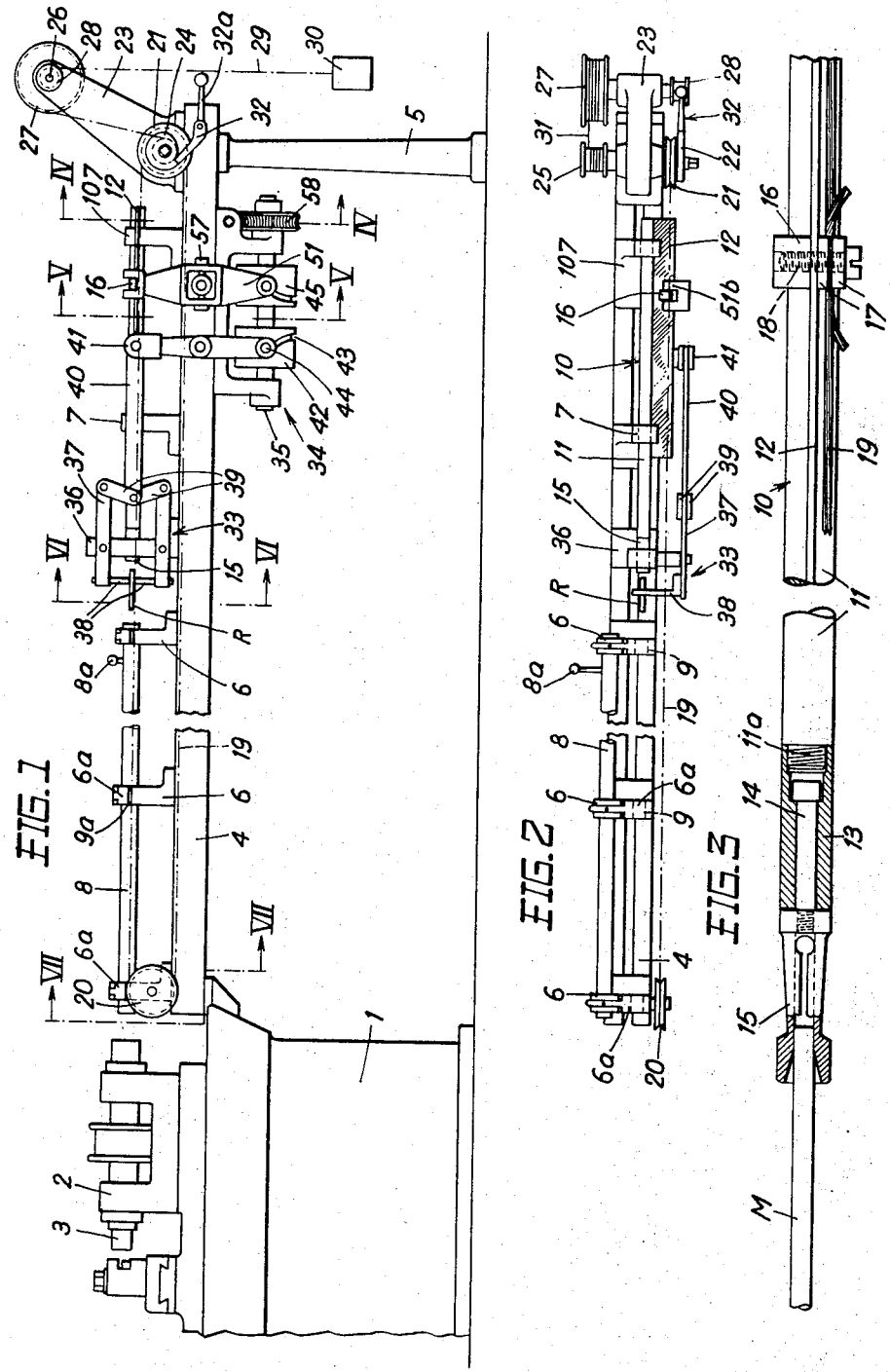

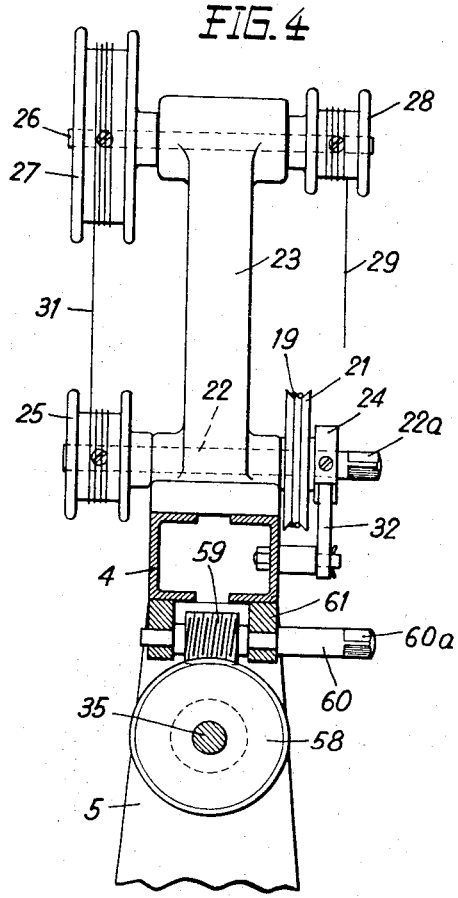
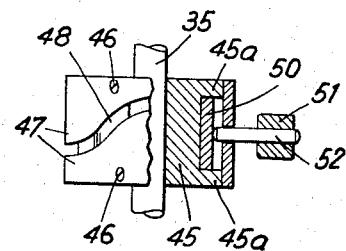
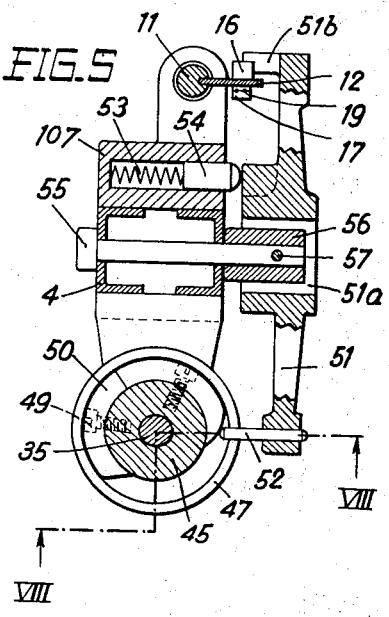
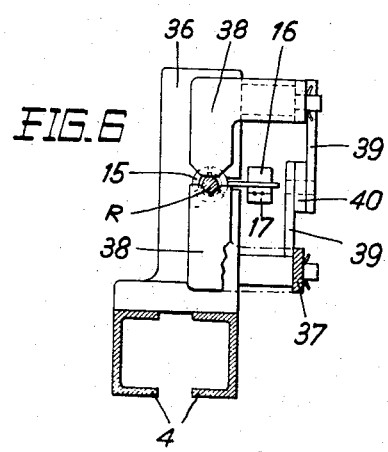
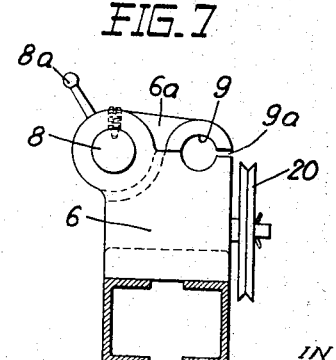

3,360,139
BAR-FEED AND CHANGE ATTACHMENT FOR
AUTOMATIC LATHES
André Bechler, 4 rue Centrale, Moutier, Switzerland
Filed Feb. 23, 1966, Ser. No. 529,402
Claims priority, application Switzerland, Mar. 25, 1965,
4,144/65
3 Claims. (Cl. 214—1.2)

ABSTRACT OF THE DISCLOSURE

An automatic lathe attachment for feeding and changing bars, the attachment having a motor driven plunger equipped with a collet pivoted thereto for gripping the rear portion of the bar to withdraw a bar remnant, a chuck clampable on the withdrawn bar remnant to release it and clampable on a new bar to insert it in the chuck, the chuck including a control shaft, three cam members fixed to the control shaft, a plurality of transfer members fixed to the shaft.

The present invention relates to a bar feeding and changing attachment for automatic lathes, comprising a motor-driven plunger for the bar being machined, said plunger being equipped with a collet chuck that is pivoted thereto and grips the bar rear portion and thereby permits withdrawal of a bar remnant.

Since in most automatic lathes the bar being machined is held, or at least narrowly guided, in a guide bushing and there is an ever-increasing number of resilient guide bushes that offer great frictional resistance to bar withdrawal, the collet pivoted to the plunger has to firmly grip the bar rear portion in order to permit it to exert a certain withdrawing force on the bar remnant through the collet, such force is greater than the resistance arising upon withdrawal.

The problem or task underlying the present invention is to further improve the conventional bar-feed attachments of the type mentioned so that the will permit rapid and convenient exchange of the bar remnant for a fresh bar and in particular to quickly and conveniently detach the plunger collet from the bar remnant and to remount same on the fresh bar.

The attachment disclosed by the present invention is characterized by a fixed chuck clampable to a withdrawn bar remnant when the plunger is entirely withdrawn, and then a fresh bar is inserted. Said chuck comprises a control shaft, three cam members fixed to the latter, and a plurality of transfer members fixed to said shaft. The first of said cam members is intended to clamp the chuck to the bar remnant during a complete revolution of the control shaft, while the second cam member at the same time operatively connects a lever belonging to the transfer members with the plunger, and the third cam member by means of said lever withdraws the plunger in order to disengage the collet thereof from the gripped bar remnant. Such operating cycle of said three cam members then is continued by the disengagement of the chuck from the bar remnant and its renewed engagement to a freshly supplied bar, the displacement of the plunger by the third cam member in order to apply the collet thereof to the rear end of the bar, the separation of the lever from the plunger by the second cam member, and the disengagement of the chuck from the bar by the first cam member.

One form of the invention is shown in the drawings, in which:

FIG. 1 is an elevation of the attachment disclosed by the invention and mounted on an automatic lathe, FIG. 2 is an appurtenant top plan view, but solely of the attachment, FIG. 3 is an elevation in a larger scale of the plunger fitted through its chuck to the rear end of a bar to be machined, FIGS. 4 to 7 show cross-sections on the lines IV—IV, V—V, VI—VI and VII—VII of FIG. 1 in a larger scale, and FIG. 8 is a section on the line VIII—VIII of FIG. 5.

The bar-feed and bar-changing attachment shown is mounted on the rear end of the bed 1 of an automatic lathe of which the headstock is designated by 2 and the operating spindle by 3. The attachment comprised a frame which in the main includes two channel joists 4 and a column 5. To the joists 4 are fixed, uniformly spaced from each other, guide posts 6 (FIGS. 1, 2 and 7) and further rearwardly two more simple guide posts 7 and 107. Through the guide posts 6 extends a shaft 8 provided with a swing handle 8a. To shaft 8 are fixed the upper post parts 6a which on inserting a fresh bar may be swung high by actuating the handle 8a. When the post parts 6a have been swung low they form, together with the lower post parts, passages 9 for a plunger generally designated by 10. As best shown in FIG. 3, plunger 10 comprises as principal part a cylindrical rod 11 of which a rear portion that is greater than the spacing of the posts 6 (FIG. 2) comprises a lateral lug 12. The latter can slide through the lateral openings 9a (FIG. 7) of the passages 9 when plunger 10 is moving longitudinally. The plunger body 11 at its forward end has a necked-down threaded end portion 11a on to which is fixedly screwed a holding member 13 of the same outside diameter as the plunger body 11. Member 13 serves for rotatably but non-displaceably mounting a pin 14 of which the non-headed end projects from member 13 and has fixedly screwed thereon the rear end of a plunger collet 15. This plunger collet 15 otherwise is longitudinally slit and destined to firmly grip the rear end of a stock bar M after the latter has been pushed-on from the rear on to said end.

The plunger collet 15 is exchangeable in accordance with the diameter and the section or shape of the stock bar M. The plunger lug 12 carries a block 16 and two cable-clamp parts 17 which together with the block 16 are secured to the plunger lug 12 by means of a screw 18. When the plunger 11 is moving horizontally, the parts 16 and 17 move past the posts 6 and 7. An endless cable 19 of which the ends are fixed between the clamp parts 17, is trained about a guide roller 20 that is mounted freely rotatable on the foremost guide post 6, and preferably in approximately one and a half windings or circuits about a drive roller 21. The latter is fixed to an axle 22 that is mounted in a cross-bore in the lower portion of a pedestal 23 secured to the rear end of the frame channels 4. To axle 22 are fixed a ratched wheel 24 adjacent to the drive roller 21, and a cable drum 25 that is on the other side of pedestal 23. An axle 26 mounted for rotation in the upper portion of said pedestal 23 carries a larger cable drum 27 alined with drum 25, and a small cable drum 28. A weight 30 is suspended from the lower end of a cable 29 that is wound about drum 28; a further cable 31 interconnects the two drums 25 and 27.

The last-mentioned parts form a weight motor for advancing the plunger 10 and the stock bar M from the rearmost position shown in FIGS. 1 and 2 to the foremost position in which the plunger lug 12 nearly abuts against the rearmost end of working spindle 3 and the plunger collet 15 is located in the forward end portion of spindle 3. Upon attaining this plunger position, there remains only a very short remnant R of the stock bar. A pawl 32 pivoted to the rear end of the frame and having a handle 32a may be brought into engagement with the ratched wheel 24 in order to maintain the feed of plunger 10 and of the stock bar M if desired.

So far the above description substantially applies to a conventional attachment.

The attachment further comprises a stationary chucking appliance or chuck generally designated by 33, that is clampable to the withdrawn stock bar remnant R when plunger 10 (FIGS. 1 and 2) has been entirely retracted and then to a freshly introduced stock bar M. The attachment further comprises an actuating appliance generally designated by 34, to which belong a control shaft 35, three cam members fixed to the latter, and transfer members operable by said cam members.

In the form shown and described, the chuck 33 and the appliance 34 are constructed as follows.

In a support 36 (FIG. 6) fixed to the frame channels 4 are mounted two two-arm levers 37 to each forward end of which is secured a clamping plate or jaw 38, and the rear ends of which by links 39 are connected in the manner of a knuckle-joint to an actuating rod 40 that extends parallel to the frame channels 4. To the rear end of rod 40 is pivoted the upper end of a two-arm transfer lever 41 that is rotatably mounted on one of the two frame channels 4. A first of the three cam members fixed to control shaft 35 comprises a simple cylinder cam 42 having a cam groove 43 machined out of its surface. In groove 43 is constantly engaged a stud 44 which also is engaged in the lower end of transfer lever 41.

The second and third cam members are combined to a single structure, as shown in FIGS. 5 and 8. A drum body 45 fixed to control shaft 35 has rim flanges 45a on which by means of screws 46 are firmly located two complementary parts 47 that leave between them a slot 48. To drum body 45 is secured, by means of screws 49, a divided radial cam body 50 between the rim flanges 45a thereof. In the lower end of a transfer lever 51 that is mounted in a kind of universal joint is fixed a feeler pin 52 that passes through the slot 48 and follows same. Pin 52 under the action of a further pin 54 which is loaded by a spring 53 and biases the transfer lever 51, is urged against the control shaft 35 and thus follows at certain times the surface of drum body 45 situated between the flanges 45a and at other times the cam body 50. The universal joint for lever 51 comprises an axle 55 rotatably mounted in the frame joists 4 and carrying a sleeve 56. The framelike centre portion 51a (FIGS. 1 and 5) of transfer lever 51 carries two bearing pins 57 that abut against sleeve 56.

To the rear end of control shaft 35 is fixed a worm gear 58 which meshes with a worm 59 (FIG. 4) fixed to an actuating axle 60. The latter is rotatable and axially immovable mounted in bearings 61 fixed to the underside of the frame joists 4, and its front end is formed to a square head 60a to receive a hand-crank (not shown) which also may be put on a square head 22a on the front end of axle 22 (FIG. 4).

The mode of operation and handling the attachment described is as follows.

When a stock bar M has been used up, and thus the lug 12 of plunger 10 has arrived just short of the rear end of working spindle 3, the automatic lathe preferably is stopped and the drive roller 21 is turned counter-clockwise (FIG. 1) by means of the handcrank set on the square head 22a (FIG. 4) thereby to retract entirely the bar remnant R by means of plunger 10, i.e. to the position shown in FIGS. 1 and 2. During such retraction also weight 30 is raised via cable 31, axle 26, drum 28 and cable 29. After this has been done pawl 32 by actuation of handle 32a is brought to engagement with ratchet 24 so as to prevent plunger 10 from being unintentionally advanced by the weight motor. During such process and indeed already during operation of the automatic lathe, control shaft 35 is in a certain initial turning position together with the three cam members 42, 47, and 50.

The handcrank is now set on square head 60a and shaft 35 is turned through a complete revolution in a predetermined sense of rotation.

When control shaft 35 first is rotated, cam member 42 becomes effective first to so move angularly the two levers 37 (FIGS. 1 and 6) via transfer lever 41, rod 40 and links 39 that the clamping plates or jaws 38 grip bar remnant R, as is shown in FIG. 1. Such clamping action continues while the radial cam body 50 biases feeler pin 52 and angularly moves the transfer lever 51 on its bearing pins 57, whereby a forked lug 51b (FIGS. 1 and 5) at the upper end of lever 51 engages block 16 of plunger 10. Said clamping action also continues while cam member 45, 47 rocks transfer lever 51 on axle 55 and withdraws plunger 10, whereby collet 15 is drawn off from the clamped bar remnant R. Subsequently, chuck 33 is opened through the first cam member 42 via lever 51 to permit removal of bar remnant R. Upon a further revolution of control shaft 35, chuck 33 is again actuated in the sense of clamping the jaws 38 to a fresh stock bar M that in the meantime has been inserted in to the guide posts 6. Upon a further revolution of control shaft 35, cam member 45, 47 by angularly moving the transfer lever 51 on axle 55, feeds plunger 10 forwardly to move collet 15 thereof on to the rear end of stock bar M (FIG. 3). In the last part of the rotation of control shaft 35, radial cam member 50 permits transfer lever 51 to release block 16 of plunger 10 and further permits the first cam member 42 to actuate chuck 33 via transfer lever 41 in the sense of loosening the grip of the jaws 38 on bar M. By actuating now handle 32a, pawl 32 may be disengaged from ratchet 24 in order that the weight motor via cable 19 may advance plunger 10 together with the fresh bar M. The automatic lathe now can resume its operation.

Various changes and alterations may be applied to the form of invention shown and described above. In place of the weight motor, for example, may be provided one of the known electric drives that may be switched on and off for feeding the plunger 10. Further, in place of the manual drive for shaft 35 may be provided a motor drive that can be switched on and off, preferably by retaining the worm gearing 58, 59 or some other equivalent gearing unit. The reason for such retention is that, particularly on closing the chuck 33 as well as on retracting the plunger 10 for the purpose of disengaging the collet 15 from the bar remnant R, as well as on pushing forwardly the plunger 10 for the purpose of mounting the collet 15 on the freshly inserted bar M, relatively great forces come to act through the cam members on to the respective transfer levers and therefore, also great torques on to control shaft 35.

I claim:

1. In a bar-feeding and changing attachment for automatic lathes, having a plunger movable by motor means for the bar being machined, which plunger is equipped with a collet pivoted thereto to grip the bar rear end and to permit withdrawal of the bar remnant, the improvement comprising a stationary chucking appliance clampable to the withdrawn bar remnant and then to a freshly inserted bar when said plunger has been entirely withdrawn, and an actuating appliance comprising a control shaft, three cam members fixed to said shaft, and a plurality of transfer members actuable by said cam members; the cam members being so adapted and constructed that in the course of a complete revolution of said shaft the first member causes the chuck to be clamped to the bar remnant, the second member operatively engages a lever belonging to said transfer members with the plunger, and the third cam member by means of this lever withdraws the plunger to disengage the collet thereof from the retained bar remnant, the first cam member causes disengagement of the chuck from the bar remnant and then a renewed clamping engagement of the chuck on a freshly introduced bar, the third cam member advances the plunger to set up the collet thereof on the rear end of the fresh bar, and finally the third cam member separates said lever from the plunger and also the first cam member disengages the chuck from said bar.

2. An attachment as set forth in claim 1 in which is provided a handcrank and an intermediate worm gearing for turning said control shaft.

3. An attachment as set forth in claim 2 in which the axis of the control shaft is disposed parallel to the direction of plunger movement, the lever is mounted in the manner of a universal joint and by means of a pin feels a groove in the third cam member as well as the surface of the second cam member which is disposed within the third cam member.

References Cited

UNITED STATES PATENTS 2,906,003  9/1959  Lakins _____ 214—1.2
3,066,806  12/1962  Lakins _____ 214—1.2

GERALD M. FORLENZA, *Primary Examiner.*

G. F. ABRAHAM, *Examiner.*